United States Patent [19]

Lucas

[11] Patent Number: 4,539,676
[45] Date of Patent: Sep. 3, 1985

[54] BULK/INTERACTIVE DATA SWITCHING SYSTEM

[75] Inventor: James A. Lucas, Broomfield, Colo.

[73] Assignee: AT&T Bell Laboratories, Murray Hill, N.J.

[21] Appl. No.: 417,504

[22] Filed: Sep. 13, 1982

Related U.S. Application Data

[63] Continuation-in-part of Ser. No. 374,400, May 3, 1982, abandoned.

[51] Int. Cl.³ .......................................... H04Q 11/04
[52] U.S. Cl. ...................................... 370/60; 370/94
[58] Field of Search ................... 370/16, 58, 60, 94; 179/2 DP, 2 R

[56] References Cited

U.S. PATENT DOCUMENTS

| | | | |
|---|---|---|---|
| 4,257,119 | 3/1981 | Pitroda | 370/58 |
| 4,276,637 | 6/1981 | Le Dieu | 370/16 |
| 4,313,036 | 1/1982 | Jabara et al. | 179/18 AD |
| 4,392,222 | 7/1983 | Ando | 370/60 |
| 4,408,323 | 10/1983 | Montgomery | 370/58 |
| 4,413,335 | 10/1983 | Clements et al. | 370/16 |
| 4,446,555 | 5/1984 | Devault et al. | 370/94 |

FOREIGN PATENT DOCUMENTS

| | | | |
|---|---|---|---|
| 57-7656 | 1/1982 | Japan | 370/60 |
| 57-4637 | 1/1982 | Japan | 370/60 |

OTHER PUBLICATIONS

*IEEE Transactions on Communications*, vol. COM-24, No. 10, pp. 1089-1100, Oct. 1976, C. J. Jenny & K. Kummerle, "Distributed Processing Within An Integrated Circuit/Packet-Switching Node".

*NAECON* 1981 *Proceedings of the IEEE* 1981, National Aerospace & Electronics Conference, Dayton, OH, USA, (May 19-21, 1981), M. J. Ross & K. A. Garrigus, "A Distributed Processing Architecture for Voice/-Data Switching".

*ICC* '80 1980 *International Conference on Communications*, Seattle, WA, USA, (Jun. 8-12, 1980), M. J. Ross, J. H. Gottshalck & E. A. Harrington, "An Architecture for a Flexible Integrated Voice/Data Switch".

Y*Computer Design*, vol. 15, No. 6, pp. 83-88, Jun. 1976, J. de Smet & R. W. Sanders, "Pacuit Switching Combines Two Techniques in One Network".

*Primary Examiner*—Douglas W. Olms
*Assistant Examiner*—Kenneth I. Rokoff
*Attorney, Agent, or Firm*—James M. Graziano

[57] ABSTRACT

Data communications connections between interactive terminals and host computers generally exhibit long holding times, while the data density of the transmissions is sparse. The circuit switch of a switching system is an inefficient and expensive medium for this type of communication. Thus, the subject switching system uses a packet switch connected in parallel with the circuit switch to handle bursty data traffic from interactive terminals. A routing bit is set in the data stream from each port circuit to indicate the nature of the transmission and this transmission is then routed to the packet switch if it is a bursty data transmissions while voice messages are routed to the circuit switch.

32 Claims, 15 Drawing Figures

| FLAG | ADDRESS | CONTROL | DATA | CRC | FLAG |
Fig-5
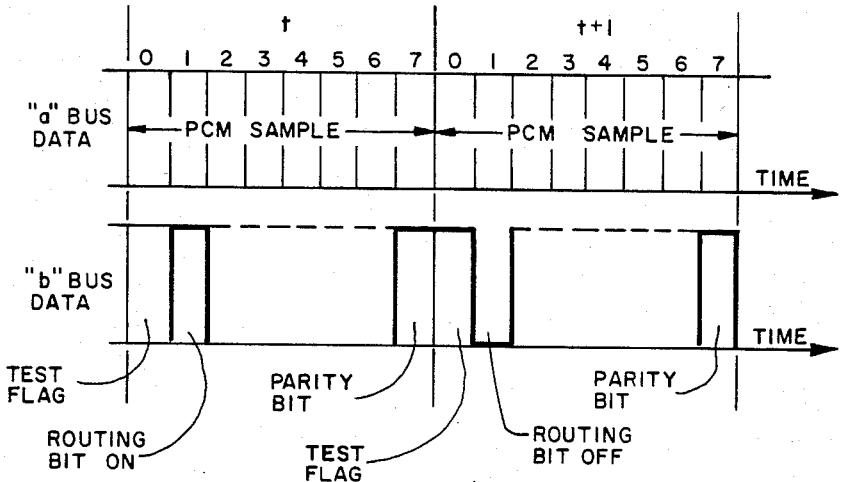
Fig-6
| | INTERFACE | CHANNEL | CONTROL/DATA | |
Fig-7
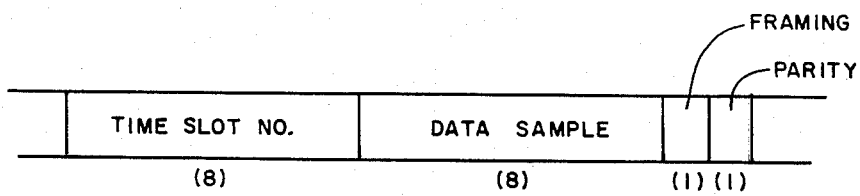
Fig-8

BULK/INTERACTIVE DATA SWITCHING SYSTEM

This application is a continuation-in-part of abandoned application, Ser. No. 374,400, filed May 3, 1982.

FIELD OF THE INVENTION

This invention relates to telephone switching systems and more particularly to a telephone switching system which contains a bifurcated switching network, one segment of which is a circuit switch for handling voice and bulk data transmissions; the other segment is a packet switch, used for handling interactive data transmissions.

DESCRIPTION OF THE PRIOR ART

Prior art telephone switching networks are circuit switches which are designed to handle voice and bulk data transmissions. These circuit switched networks establish a fixed connection between two end points and maintain this connection, in space division or time division fashion, for the duration of the call. However, a circuit switch is an inefficient and expensive medium for interconnecting interactive data terminals with host computers. The reason for this is that data communication connections between interactive terminals and host computers generally exhibit long holding times while the data density of the transmissions is sparse. Therefore, a fixed connection between an interactive terminal and the host computer requires the dedication of a significant amount of network and host computer resources in relation to the amount of information transferred by the circuitry.

Prior art telephone switching systems either suffer the inefficiency and cost of such transmissions through their circuit switch or establish separate, independent data networks to handle interactive data terminals. These separate data networks typically have the interactive data terminals hardwired into the system. The result is that the customer has two colocated independent switching systems, one for voice only and one for data only. This configuration necessitates duplicate building wiring to enable each user to access either or both of the switching systems. One variation on those solutions is the use of a packet switch as a concentrator, to sub-rate multiplex the interactive data transmissions. This minimizes the impact of interactive data terminals on the telephone switching system because only a few of these multiplexed transmissions need be switched through the circuit switch to a demultiplexor. Once again, the data terminals are hardwired to the separate data network (packet switch).

SUMMARY OF THE INVENTION

The telephone switching system of the descriptive embodiment overcomes this problem by providing a single switching system which efficiently handles both data and voice transmissions. This is accomplished by using a switching network which has a number of independent segments. The switching network disclosed herein contains two segments, each of which is specifically designed for a specific type of traffic. One segment of this switching network is the traditional circuit switch which is optimized for interconnecting users who generate voice and bulk data transmissions. The other segment of this switching network is a packet switch which handles interactive data transmissions from interactive data terminations. This interactive data traffic has a bursty nature and the packet switch is therefore the ideal mechanism for handling this traffic.

Terminal equipment is connected to any port in the subject telephone switching system regardless of the nature of the equipment. Each port circuit can serve either voice-only, data-only or combined voice and data terminal equipment. The telephone switching system of the descriptive embodiment routes the voice and data transmissions from this terminal equipment to the selected segment of this bifurcated switching network depending upon the nature of the transmission. In particular, this telephone switching system switchably connects the terminal equipment which generates interactive data to the packet switch segment of the switching network while the terminal equipment which generates voice and bulk data transmissions is switched by the circuit switch segment of the switching network.

The data and/or PCM-encoded voice transmissions from the terminal equipment served by this telephone switching system are transferred by the port circuits into a series of eight bit data segments. An eight bit control segment is generated by the telephone switching system for each of these eight bit data segments and is used for maintenance, testing and, call routing. Each pair of eight bit segments (data+control) are then forwarded from the port circuit to the circuit switch and packet switch access segments of the switching network. Only the PCM-encoded voice and bulk data transmissions are switched through the circuit switch segment of the switching network while the interactive data transmissions are switched by the packet switch segment of the switching network. This distinctive call handling is accomplished by setting a routing bit in the eight bit control segment which is associated with an eight bit data segment from an interactive data terminal. This routing bit setting is detected by a packet access circuit which responds to the routing bit being set by switching the so-designated eight bit segments to the packet switch. The packet switch then switches the eight bit data segments to the designated destination.

Thus, by using a routing bit in the eight bit control segment, selected classes of transmissions can be routed to the packet switch segment of the telephone switching network. This arrangement makes most efficient use of the switching equipment by removing the bursty transmissions from the circuit switch without having the penalty of a completely separate switching system. The single telephone switching system concurrently handles voice, bulk and bursty data transmissions from any port circuit in the system. Thus, the terminal equipment can be connected to any port circuit in the system without concern for the type of transmissions generated by this terminal equipment.

BRIEF DESCRIPTION OF THE DRAWINGS

FIGS. 5–8 and 15 illustrate the various data message configurations used in the subject system.

DETAILED DESCRIPTION OF THE DRAWINGS

Figure 1:
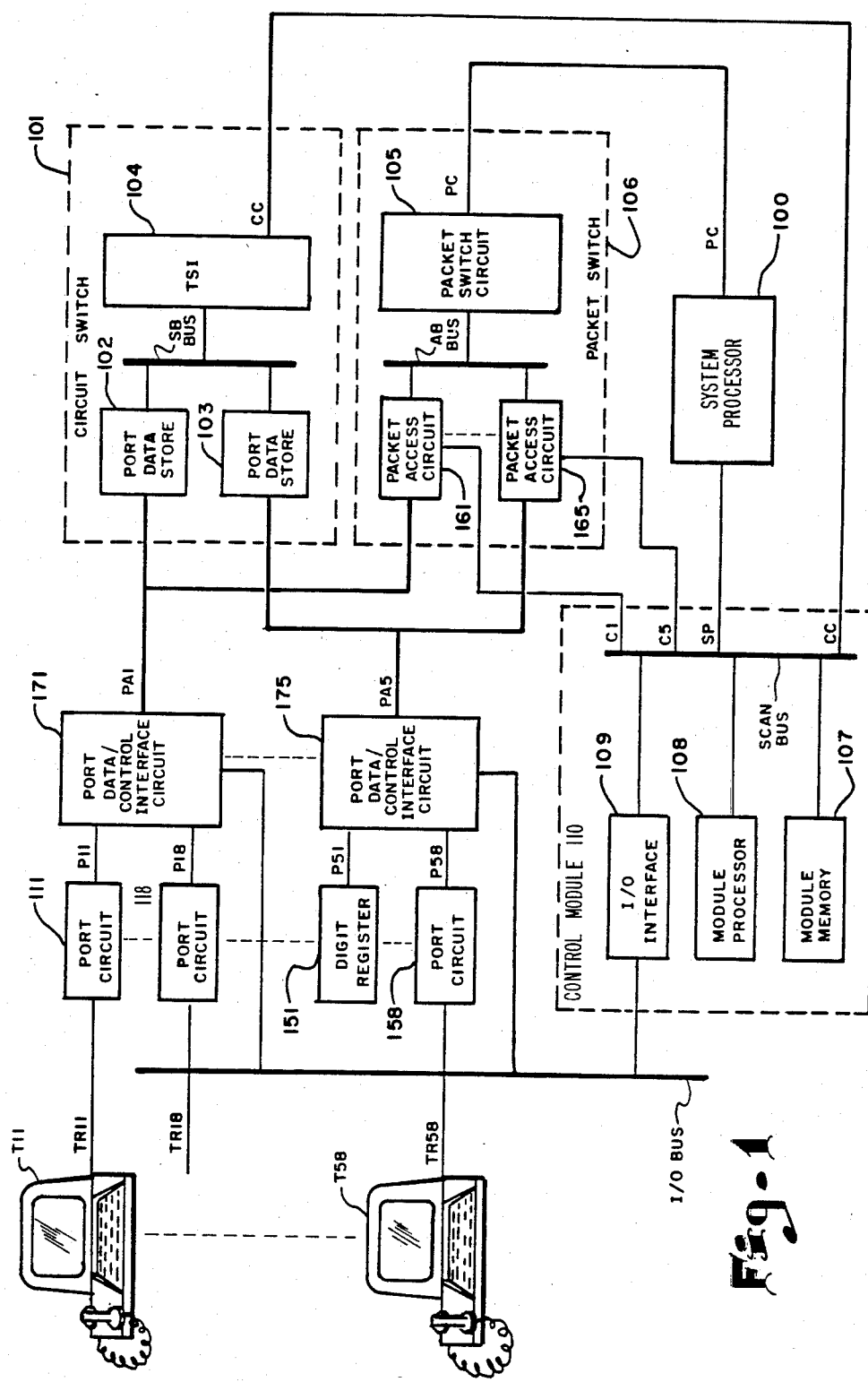
FIG. 1 illustrates the telephone switching system of the subject in ention which incorporates a bifurcated switching network.

The telephone switching system of this invention is illustrated in FIG. 1. This system includes a plurality of terminal equipment T11-T58 each of which is associated with a respective one of port circuits 111-158. This terminal equipment includes telephone station sets as well as digital terminal devices. A circuit switch 101, which comprises a time slot interchange circuit of the type illustrated in U.S. Pat. No. 4,112,258, interconnects a number of port data/control interface circuits 171-175, each of which serves a plurality of port circuits 111-158 and their associated terminal equipment (T11-T5B). Circuit switch 101 establishes communications connections among port circuits 111-158 using time slot interchanger (TSI) 104. The system of FIG. 1 also includes a packet switch 106 comprising a packet switch circuit 105 and a plurality of packet access circuits 161-165 provided on a one per port data/control interface circuit (171-175) basis. Packet switch circuit 105 is well-known in the art and serves to interconnect port data/control interface circuits 171-175 via the associated packet access circuits 161-165. Packet switch 106 operates to also establish communications connections among port circuits 111-158 as is described below.

Each port data/control interface circuit (e.g. 171) shown in FIG. 1 serves eight port circuits (111-118) and functions to interface these port circuits with circuit switch 101 as well as the system processor 100 via I/O interface 109. In this system, a control module 110 comprising module processor 108, I/O interface 109, and module memory 107 performs many of the hardware-oriented and real-time intensive tasks such as circuit scanning. control module 110 deloads system processor 100 and functions to insulate system processor 100 from the hardware details of the circuits served by the system.

MESSAGE FORMAT

The terminal equipment served by the telephone switching system may be various types of equipment, and the equipment illustrated in FIG. 1 has concurrent voice and data transmission capability. In this system, all the terminal equipment, which receive voice transmissions from the user, converts the received analog voice signals into a set of digital data segments, each comprising an eight bit PCM-encoded voice sample. The terminal equipment serves or generates digital transmissions (such as keyboards) receive or originate digital data messages which are generally of length greater than eight bits. The typical format of these data messages is illustrated in FIG. 5. Each data message includes flag characters at the beginning and end of the data message; data, control and address fields; and a cyclic redundancy check field for error checking purposes. The terminal equipment illustrated in FIG. 1 divides up this data message and transmits same to the telephone switching system in eight bit data segments. Thus, all data segments generated by all terminal equipment are eight bits long. For the terminal equipment having concurrent voice and data capability, both eight bit PCM-encoded voice samples and eight bit data segments must be concurrently transmitted.

Figure 15:
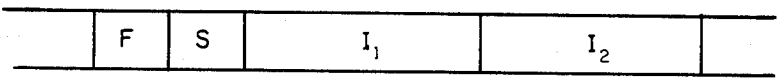

A particular message segment format is used in this system which enables concurrent voice and data transmission. This format is illustrated in FIG. 15. Each message segment consists of framing bits and three fields: a control or S field, and two data or Information (I) fields. This is a well-known data transmission format wherein one of the data fields can be used for the transmission of voice information while the other data field (or both data fields) can be used for the transmission of either bulk or interactive data. Thus, in the system of the present disclosure, assume that the voice-only terminal equipment only place the eight bit PCM-encoded voice samples in the first I field ($I_1$) of each message segment; data-only terminal equipment only place the eight bit data segments in the second I field ($I_2$) of each message segment; while the combined voice and data terminal equipment use both I fields, placing the eight bit PCM-encoded voice samples in field ($I_1$) and the eight bit data segments in field ($I_2$) of each message segment. Thus, all the signals transmitted to the telephone switching system from the terminal equipment is in the format illustrated in FIG. 15.

CALL PROCESSING

The telephone switching system must distinguish among the various types of transmissions and switch each according to the nature of the transmission, as mentioned above. The operation of this system will be illustrated by describing the processing of various calls. Module processor 108 controls the scanning of port circuits 111-158 as well as the operation of circuit switch 101. In particular, module processor 108 generates a scan frame rate such that each port, trunk and service circuit connected to circuit switch 101 is scanned once during each network scan cycle. Module processor 108 accomplishes this by transmitting timing, address and control information to I/O interface 109 via SCAN BUS. I/O interface 109 then transmits these signals via I/O BUS to port data/control interface circuits 171-175. Each port data/control interface circuit (e.g. 171) interprets the signals received on I/O BUS during each scan frame and determines whether the address signals transmitted thereon identify one of the port circuits (e.g. 111) served by that port data/control interface circuit (171). If such a match occurs during a scan frame, port data/control interface circuit 171 enables the identified port circuit 111 during the first half of the scan frame which, in turn, reads the data (via leads P11) being transmitted to port data/control interface circuit 171 by module processor 108. Port circuit 111 is responsive to this control data for controlling the operation of the associated terminal equipment T11. This is accomplished by port circuit 111 transmitting control segments which indicate the desired operation to terminal equipment T11 in the S field of the message segment illustrated in FIG. 15. Terminal equipment T11 responds to these control segments by performing the indicated operation, such as lighting a lamp, producing an audible ring signal, etc. During the second half of the scan cycle, port circuit 111 transmits control data, which has been received from terminal equipment T11 as control segments in the S field of the message segments illustrated in FIG. 15, to module processor 108. These control data transmissions from port circuit 111 are received by port data/control interface circuit 171 and forwarded via I/O BUS to I/O interface 109, which, in turn, transmits the control data to module processor 108 via SCAN BUS. In this fashion, control data are exchanged between terminal equipment T11-T58 and module processor 108.

Module processor 108 responds to this control data by creating a control message (containing this control data) to be transmitted to system processor 100. The transmission is accomplished by module processor 108 generating an interrupt which is transmitted to system processor 100 via SCAN BUS. System processor 100 responds to the interrupt by reading the control message from module processor 108. Thus, the control data generated by the terminal equipment is first handled by module processor 108 and then relayed to system processor 100.

Figure 2:
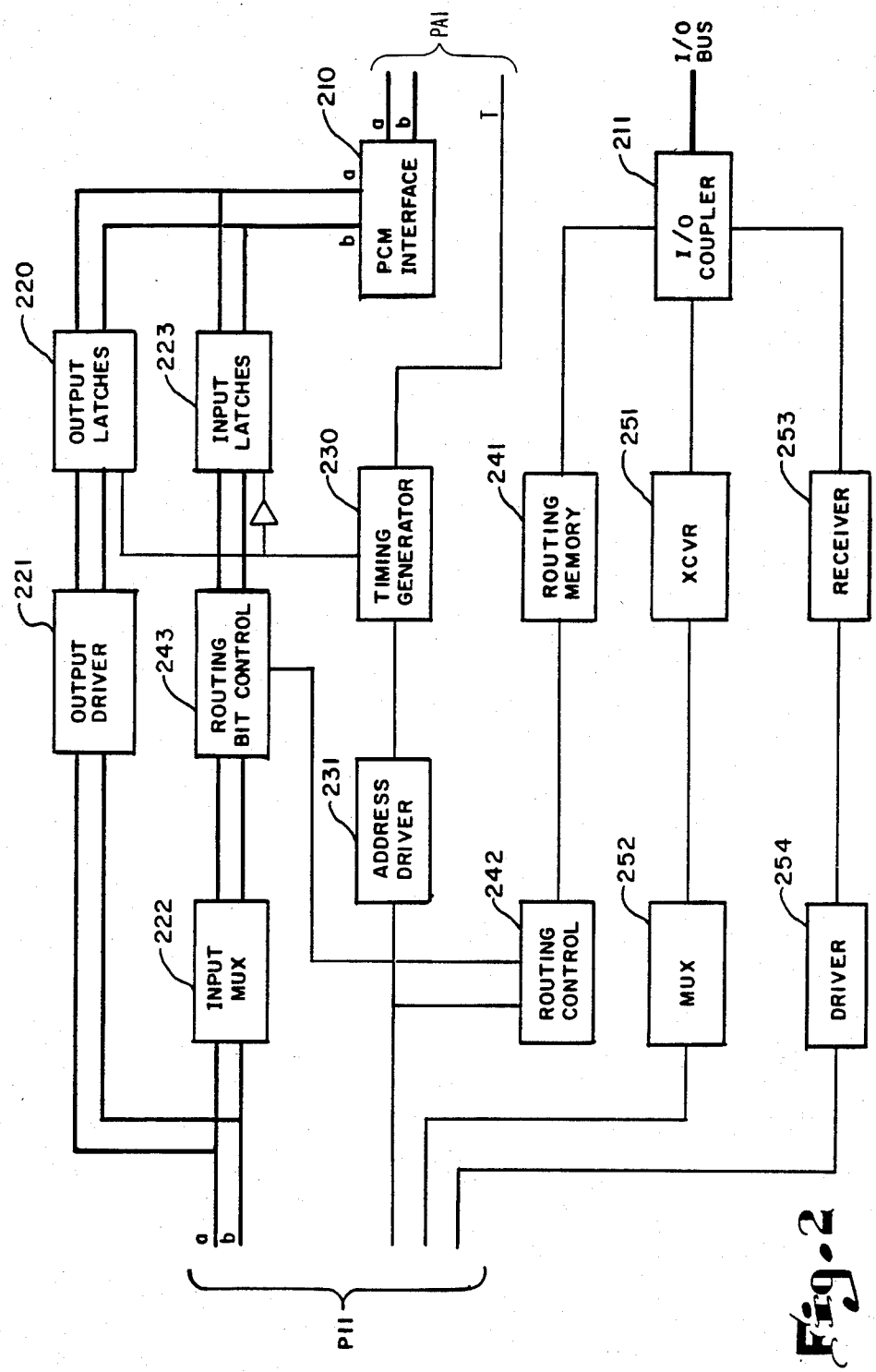
FIG. 2 illustrates the circuitry used to implement the port data/control interface circuit.

The transmission of data and PCM-encoded voice from terminal equipment T11–T58 are controlled by circuit switch 101. In particular, these transmissions from terminal equipment T11 are stored in the associated port circuit 111 until retrieved by circuit switch 101 via port data/control interface circuit 171 which serves port circuit 111. In particular, assume that a user at terminal equipment T11 wishes to establish a voice connection through the telephone switching system to the user at terminal equipment T58. The user at terminal equipment T11 goes off-hook and terminal equipment T11 generates a request for service. This is accomplished by terminal equipment T11 transmitting a control segment which indicates an off-hook in the S field of message segments (as illustrated in FIG. 15) to port circuit 111 during the scan frame associated with port circuit 111. Since this is the call setup phase of the call, the I fields will not contain any data. These control segments contain a coded message representing an off-hook indication and port circuit 111, when scanned as described above, relays this data/control to port data control interface circuit 171 via leads P11. Port data/control interface circuit 171 relays this control data via I/O BUS, I/O interface 109 and SCAN BUS to module processor 108. The circuitry of port data/control interface circuit 171, which accomplishes this control data transfer, is illustrated in FIG. 2. In particular, the portion of port data/control interface circuit 171 which processes this control data comprises I/O coupler 211, transceiver (XCVR) 251, multiplexer 252, receiver 253, and driver 254. I/O coupler 211 receives the control data transmitted from module processor 108 via SCAN BUS through I/O interface 109 and I/O BUS and removes the timing and address information from the control data. This timing and address information is switched by receiver 253 and driver 254 to enable port circuit 111 via leads P11. I/O coupler 211 concurrently transmits the remainder of the control data to port circuit 111 via transceiver 251 and multiplexor 252 during the first half of the scan frame and receives control data from port circuit 111 over the same path in the reverse direction during the second half of the scan frame.

ESTABLISHING A COMMUNICATION CONNECTION

This above-described request for service is received by system processor 100, which determines what action should be taken to serve this request. In this case, system processor 100 responds to the off-hook indication by assigning an idle digit register circuit 151 to be connected to the port circuit (111) requesting service. System processor 100 allocates a network time slot in circuit switch 101 to accomplish this interconnection by transmitting network control signals to circuit switch 101 via lead SP, module processor 108, SCAN BUS and lead CC. Circuit switch 101 responds to these network control signals by writing into the memory map portion of time slot interchanger (TSI) 104 the correspondence between the allocated network time slot (path through the network) and the network appearances of the circuits to be interconnected, which are the memory locations in port data stores 102, 103 which are assigned respectively to terminal equipment T11 and digit register circuit 151.

Each piece of terminal equipment (e.g. T11) is assigned a pair of memory locations in the port data store serving that terminal equipment T11. One of these memory locations is for storing signals transmitted from terminal equipment T11 to time slot interchanger 104 while the other memory location is for storing signals transmitted to terminal equipment T11 by time slot interchanger 104. When the network time slot assigned to a communication connection which includes terminal equipment T11 is reached, the transmissions from all the circuits assigned to this communication connection are interchanged. In particular, during the first half of the network time slot, time slot interchanger (TSI) 104 reads out the eight bit PCM-encoded voice sample from the memory location in port data store 102 associated with transmissions from terminal equipment T11 to time slot interchanger 104 and writes same via bus SB into the memory location in port data store 103 associated with transmission to digit register circuit 151 from time slot interchanger 104. During the second half of the network time slot, time slot interchanger 104 reads out the eight bit PCM-encoded voice sample from the memory location in port data store 103 associated with transmissions from digit register circuit 151 to time slot interchanger 104 and writes same via bus SB in the memory location in port data store 102 associated with transmissions from time slot interchanger 104 to terminal equipment T11.

These exchanged transmissions remain in their respective port data stores and each transmission is forwarded to the associated terminal equipment during the first half of the scan frame assigned to that piece of terminal equipment. This is accomplished by circuit switch 101 enabling (for example) the memory location in port data store 102 associated with transmissions to terminal equipment T11 from time slot interchanger 104. Simultaneously, port data/control interface circuit 171 reads out the data stored in this memory location and transmits same to port circuit 111 which has been concurrently addressed by port data/control interface circuit 171. During the second half of this scan frame, port data/control interface circuit 171 receives transmissions from port circuit 111 and writes same into the now enabled memory location in port data store 102 associated with transmissions from terminal equipment T11 to time slot interchanger 104. In the call being discussed, digit register circuit 151 outputs a data transmission (eight bit PCM-encoded dial tone) which is stored in the aforementioned memory location in port data store 103 assigned to transmissions from digit register circuit 151 to time slot interchanger 104. When the network time slot allocated to this communication connection is reached, time slot interchanger (TSI) 104 reads out this data transmission from the memory location in port data store 103 associated with transmissions from digit register circuit 151 to time slot interchanger 104 via SB BUS and writes this data transmission into the memory location in port data store 102 assigned to transmissions from time slot interchanger 104 to terminal equipment T11. Since, in this example, terminal equipment T11 has not produced a transmission, there is no data transfer in the reverse direction. This transferred data transmission remains in port data store 102 until the clock portion of module processor 108 reaches the scan frame assigned to terminal equipment T11, at which time port data/control interface circuit 171 enables port circuit 111 as described above and reads the data transmission out of the aforementioned memory location in port data store 102, which memory location is simultaneously addressed by time slot interchanger 104. Port data/control interface circuit 171 transfers the data transmission from the enabled memory location in port data store 102 to port circuit 111, which outputs the eight bit PCM-encoded dial tone to terminal equipment T11 via field $I_1$, in the message segment transmitted on leads TR11.

CALL DIALING

Thus, the user at terminal equipment T11 receives dial tone, and then dials the station number of terminal equipment T58. The dial pulses or tones so generated are encoded into eight bit PCM samples by terminal equipment T11 and transmitted to the telephone switching system where they are switched by circuit switch 101 to digit register circuit 151 in the manner outlined above. When dialing is completed, module processor 108 reads out the dialed number from digit register circuit 151 via port data/control interface circuit 175 I/O BUS, I/O interface 109 and SCAN BUS. Module processor 108 transmits the dialed number to system processor 100 which decodes the dialed number to determine the destination of this call. In doing so, terminal equipment T58 is identified as the destination terminal equipment and system processor 100 signals terminal equipment T58 by activating port data/control interface circuit 175 with a ringing control message transmitted via module processor 108, SCAN BUS, I/O interface 109 and I/O BUS. Port data/control interface circuit 175 responds to the ringing control message by applying an alerting signal to terminal equipment T58 via port circuit 158 and communication leads TR58. The user at terminal equipment T58 goes off-hook in response to the alerting signal and cuts through to terminal equipment T11 via the network time slot assigned to this communication connection by system processor 100 signalling circuit switch 101 via module processor 108 to substitute terminal equipment T58 for the digit register circuit 151 on this communication connection.

BURSTY TRANSMISSIONS—INTERACTIVE TERMINALS

In the case where terminal equipment T11 is a piece of interactive terminal equipment and terminal equipment T58 is either a host computer or another interactive terminal, communication between these two elements would typically be highly bursty in nature. Thus, in a circuit switch connection, the time slot dedicated to this communication connection would be carrying idle characters for a significant portion of the time, since there is no data transmission to transfer between the two terminal equipments. Therefore, in a telephone switching system having a large number of interactive data terminals, the circuit switch has many time slots occupied by such communication connections while the data throughput in circuit switch 101 is minimal.

The subject telephone switching system removes these bursty transmissions from circuit switch 101 by adding an adjunct switch 106 which consists of packet switch circuit 105 and a packet access circuit 161–165 on a one per port data/control interface circuit 171–175 basis to the above-described system. This system, as mentioned above, serves terminal equipment having concurrent voice and data transmission capability and, in particular, bursty data transmissions are originated by interactive terminals which may also have voice transmission capability. Rather than relegating these interactive terminals to a separate data switching system, the subject telephone switching system provides service to these interactive terminals which may be connected to any port circuit in the subject system. The presence of an interactive terminal can be communicated to the subject telephone switching system in any one of a number of ways and the manner selected herein is a class-of-service indication. Thus, when an interactive terminal is connected to a port circuit, the telephone switching system administrator assigns a predetermined class of service to this port circuit indicating the presence of such a terminal.

In this system, recall that during the call setup phase of a communication connection, the data or I fields do not contain any data. Instead, the message segments contain only call setup information which is present in the control or S field. This call setup information is itself bifurcated, with one segment relating to the first ($I_1$) data field and the other relating to the second ($I_2$) data field. Depending upon the nature of the communication connection (i.e., voice only, data only, or voice+data), one of these control segments may be vacant. In the concurrent voice and data case, both control segments are used. Port circuit 111 extracts the control information carried in the S field of each message segment and routes this information on via port data/control interface circuit 175 I/O BUS, I/O interface 109, module processor 108 and SCAN BUS to system processor 100. System processor 100 interprets the control information so received and allocates the necessary network connection in circuit switch 101 for the voice transmission (as described above) by assigning a time slot in circuit switch 101 for the interconnection of terminal equipment T11 with the destination equipment which, as described above, is assumed to be terminal equipment T58. Thus, during this designated time slot, circuit switch 101 transfers the voice or bulk data portion of the message segments between the location in port data store 102 allocated to terminal equipment T11 and the memory location in port data store 103 allocated to terminal equipment T5B via SB bus to thereby accomplish the voice circuit interconnection of these two elements of terminal equipment, as described above.

INTERACTIVE DATA FORMAT

If the message segment carries interactive data messages in one of the I fields, the S field information relayed during call setup to system processor 100 indicates the nature of this data message. As was mentioned above, this data message is transmitted in piecemeal fashion, with an entire data message being composed of a number of successive I field transmissions. However, system processor 100 must first identify the source of this data message as an interactive terminal. This is accomplished by reading the class of service associated with the originating port circuit 111 and determining whether the data portion (field $I_2$) of the message segment is being used. This use is communicated by the control message transmitted from the terminal in the S field of the message segment. System processor 100 detects the presence of an interactive terminal connection in this fashion and routes the so identified data segments to packet switch 106 by setting a routing bit during call setup in port data/control interface circuit 171 for this data connection.

MESSAGE SEGMENTS

To describe the routing of such a transmission, the voice or data segment of the message segment must be described in further detail. In particular, port data/control interface circuit 171 (illustrated in FIG. 2) contains two signal paths, "a" bus and "b" bus. The timing diagram of FIG. 6 illustrates the signals which appear on these signal paths for scan frames t and t+1. The "a" bus carries the eight bit PCM-encoded voice sample (or the eight bit data segment) while the "b" bus carries the eight bit control segment (mentioned above) which is associated with the eight bit PCM-encoded voice sample. As shown in FIG. 6, the eight bit control segment includes a number of signal fields, such as test flag, parity, and routing bit. As illustrated, for the control segment of scan frame t, the routing bit is set on while for the following scan frame control segment, the routing bit is set off. The timing for these various fields on both "a" and "b" bus are created by circuit switch 101. The port data/control interface circuits 171–175 and port circuits 111–158 read/write information out of-/into these fields as the voice and control segments are transmitted between the port circuits 111–158 and circuit switch 101.

Port data/control interface circuit 171 receives "a" bus, "b" bus and timing signals from circuit switch 101. The module clock (not shown) of circuit switch 101 transmits clock and address information to all port data/control interface circuits 171–175 via bus T and timing generator 230 contained therein decodes this information into a port address which is applied by address driver 231 to leads P11 to enable the selected port circuit (111). Timing generator 230 simultaneously produces clock signals to enable output latches 220 during the first half of the scan frame and input latches during the second half of the scan frame. Thus, during the first half of the scan frame associated with port circuit 111, port data store 102 transmits a pair of eight bit data and control segments (from the memory location in port data store 102 associated with transmissions from TSI 104 to terminal equipment T11) via "a" and "b" busses and PCM interface 210 to enabled output latches 220. These elements drive output driver 221 and thereby transmit the data and control segments to port circuit 111. Transmissions in the reverse direction occur during the second half of the scan frame via input multiplexor 222, routing bit control 243, input latches 223 and PCM interface 210 of port data/control interface circuit 171.

The routing bit of the control segment is controlled by system processor 100, which identifies the transmissions to be switched by each switch segment in the system. In the present system, system processor 100 simply identifies the port circuits involved in interactive data calls and transmits control data indicating the identity of such port circuits to port data/control interface circuits 171–175 via SCAN BUS, I/O interface 109, I/O BUS. I/O coupler 211 in port data/control interface circuit 171 receives this control data and sets a flag bit in the memory location in routing memory 241 associated with the so identified port circuits. Routing control 242 is responsive to a particular port circuit (e.g. 111) being enabled by address driver 231 for reading the contents of the memory location in routing memory 241 associated with port circuit 111 to determine the status of the routing flag bit therein. Based on this status, routing control 242 activates routing bit control 243 during bit position 1 of the eight bit control segment on "b" bus and routing bit control 243 sets the routing bit in the control segment to correspond to the status indicated in routing memory 241.

PACKET ACCESS CIRCUIT

Figure 3:
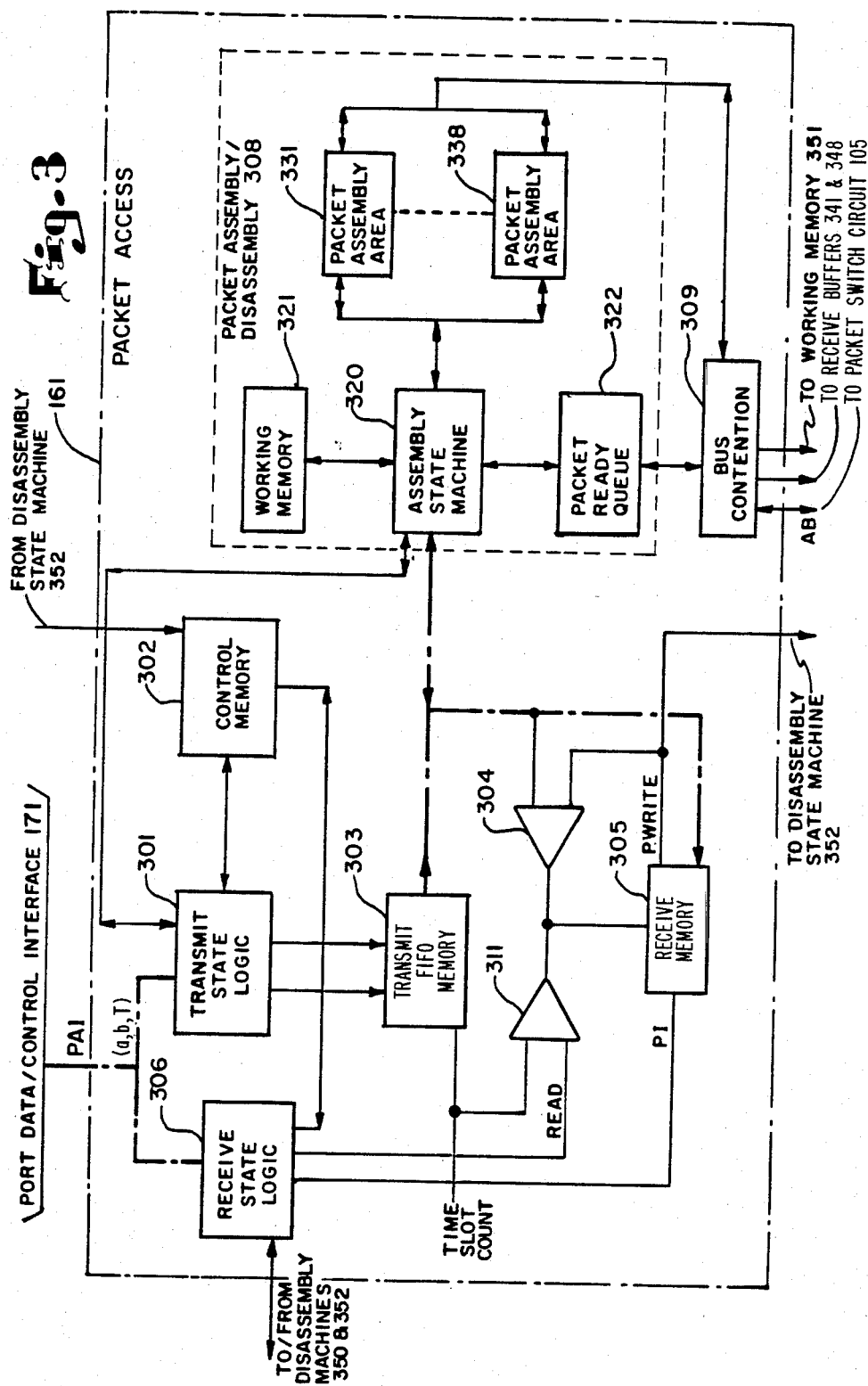
FIGS. 3 and 4 illustrate the circuitry used to implement the packet access circuit.
Figure 4:
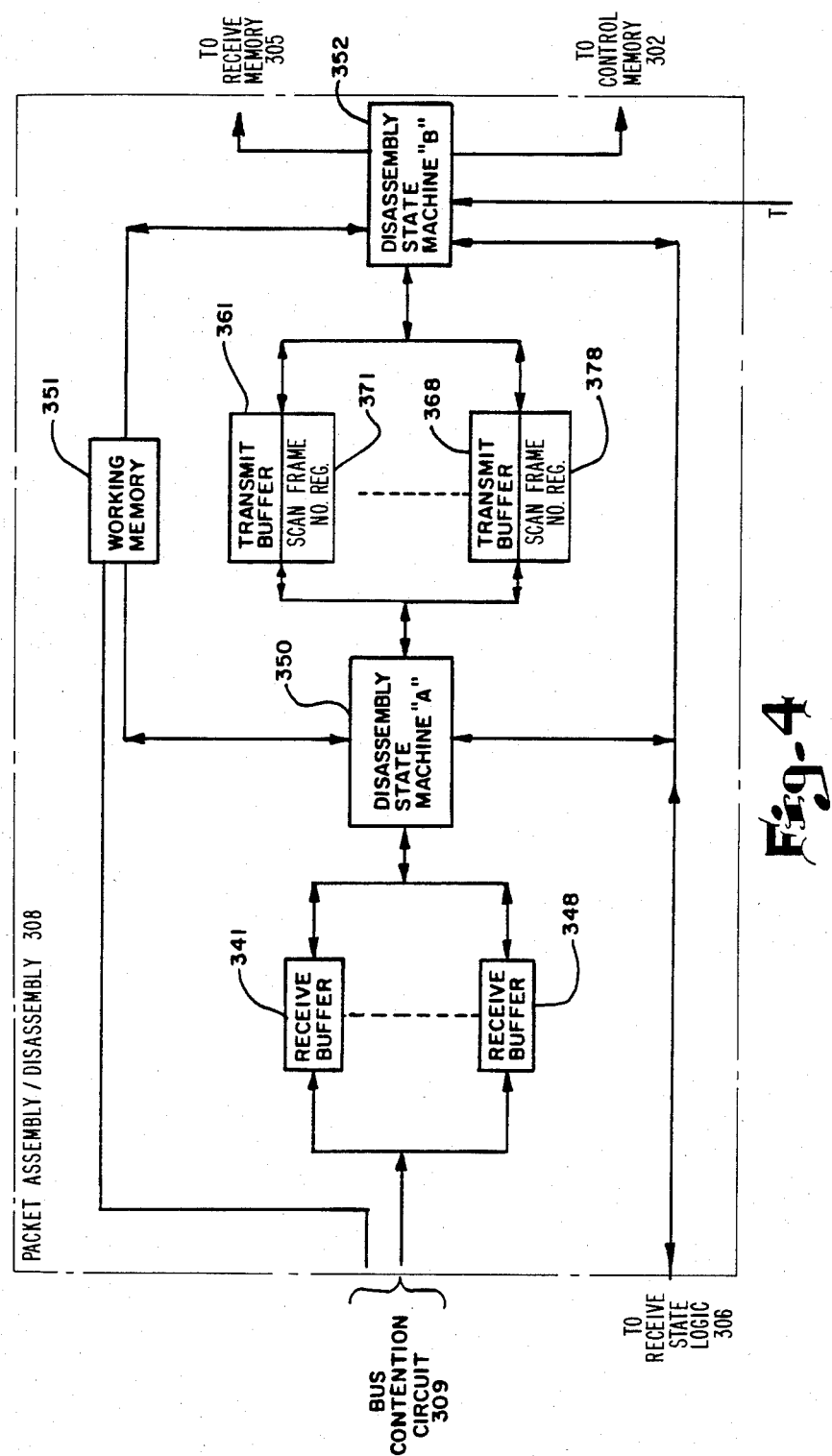

Packet access circuit 161 of this invention is illustrated in FIG. 3 wherein packet access circuit 161 interconnects bus PA1 (comprising the "a", "b" and T busses) from port data/control interface circuit 171 with the packet switch circuit 105 via AB bus. The switching of the message segments through packet access circuit 161 is controlled by the routing bit which is contained in the eight bit control segment. Packet access circuit 161 includes control circuitry comprised of transmit state logic 301 and receive state logic 306 which respectively manage the transmission of data segments from port data/control interface circuit 171 to transmit FIFO memory 303 and in the reverse direction from receive memory 305 to port data/control interface circuit 171. The state logic circuits 301, and 306, respectively can be implemented as a pair of wired logic control circuits in the case of high speed data transmissions or could be a processor-based implementation for lower speed data transmissions. The exact details of this implementation are well within the skill of any competent circuit designer and is not discussed in detail herein. Suffice it to say that, for this description, transmit and receive state logic circuits 301, and 306, respectively are wired logic circuits which perform the functions of: deleting/adding interpacket flag characters, zero deletion/insertion for data transparency in the protocol, deletion of data which lacks the routing bit, format conversion, parity generation and checking, framing, mapping between assigned time slots on bus PA1 and address stored in FIFO memory 303 and other miscellaneous control and timing functions. Transmit and receive state logic circuits 301, and 306, respectively access control memory 302 for the mapping functions mentioned above.

TRANSMIT STATE LOGIC

Figure 9:
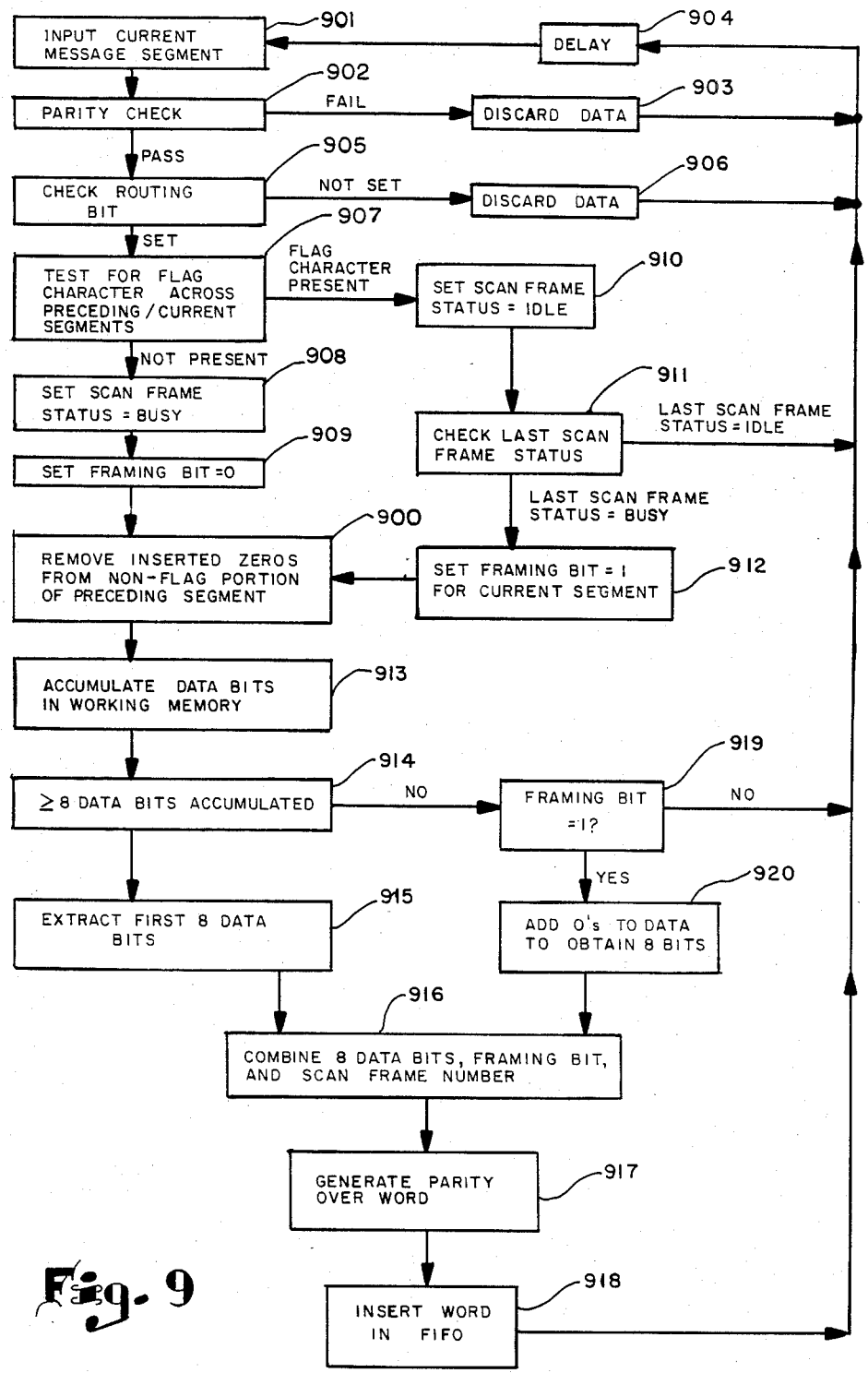
FIGS. 9–14 illustrate, in flow chart form, the details of the packet access circuit.

Packet access circuit 161 receives all outgoing data transmissions which appear on bus PA1 from port data/control interface circuit 171. Transmit state logic 301 monitors these transmissions, and only processes the transmissions that contain a routing bit to indicate an interactive data transmission. In particular, FIG. 9 illustrates the state table or flowchart representation of the operation of transmit state logic 301. Every message segment output by port data/control interface circuit 171 on bus PA1 is received (901) in serial fashion by transmit state logic 301, which checks the parity (902) of the message segment as received. If the computed parity does not match the parity bit in the control segment of the message segment, the entire message segment is discarded (903) and transmit state logic 301 resets until the following scan frame. If the parity matches, the routing bit (bit position 1, "b" bus—FIG. 6) is checked (905) to see if it is set. If the routing bit is OFF as in the message segment t+1 of FIG. 6, this indicates that the transmission is for circuit switch 101 and the message segment is discarded (906) by transmit state logic 301. Again, transmit state logic 301 resets and delays (904) until the next scan frame.

A message segment containing the routing bit ON (as in message segment t in FIG. 6) indicates, in this system, that the transmission includes an interactive data segment that requires switching by packet switch circuit 105. Such message segments are tested for flag characters (907) when received by transmit state logic 301 to determine whether the end of the data message (as illustrated in FIG. 5) has been reached. If no flag character is present, this indicates that the message segment is part of an existing data message transmission, the scan frame is recorded as busy (908) and any inserted zeroes (for data transparency) in the message segment for this scan frame are deleted (909). If a flag character was present, this indicates an idle scan frame and transmit state logic 301 records the scan frame idle (910) and the previously recorded status of this scan frame is then checked (911). If this scan frame was previously idle, there are no data transmissions taking place during this scan frame, just idle flags, transmit state logic 301 resets (904) because this is an idle scan frame. If this scan frame was previously busy, then the flag character received is indeed an end of message signal, and a framing bit must be generated (912) for the received data message and appended thereto.

The received data bits and/or the framing bit are added (913) to the data bits previously received in the preceding message segments which data bits are stored in a working memory. Transmit state logic 301 determines the number of data bits stored in the working memory (914) and, if there are eight data bits or more, a packet component can be created. This is done by taking the first eight data bits (915) from the working memory, adding the current scan frame number as a header, and appending a framing bit to the end of the resultant packet component (916). The parity of the packet component is calculated (917) and the packet component is now in the format illustrated in FIG. 8. This packet component is now output (918) by transmit state logic 301 to transmit FIFO memory 303 and transmit state logic 301 resets (904) until the next scan frame. (When the framing bit is generated in the course of receiving the data bit (919), the working memory is stuffed with a sufficient number of zeroes (920) to create a final eight bit data message.)

PACKET ASSEMBLY/DISASSEMBLY CIRCUIT

When a packet component created as described above is available in transmit FIFO memory 303, packet assembly/disassembly circuit 308 reads out the packet component from transmit FIFO memory 303, combines this packet component with previously accessed packet components into a packet, and reformats it into the arrangement illustrated in FIG. 7. The interface field of this packet, when being sent to the packet switch, represents the identity of the source packet access. When received from the packet switch, the interface field represents the identity of the destination which, in this case, is packet access circuit 165. The channel field of this packet represents additional routing information which comprises the packet address illustrated in FIG. 5 and time slot number illustrated in FIG. 8. Once packet assembly/disassembly circuit 308 has completed the reformatting, bus contention circuit 309 bids for access to packet bus AB.

Figure 10:
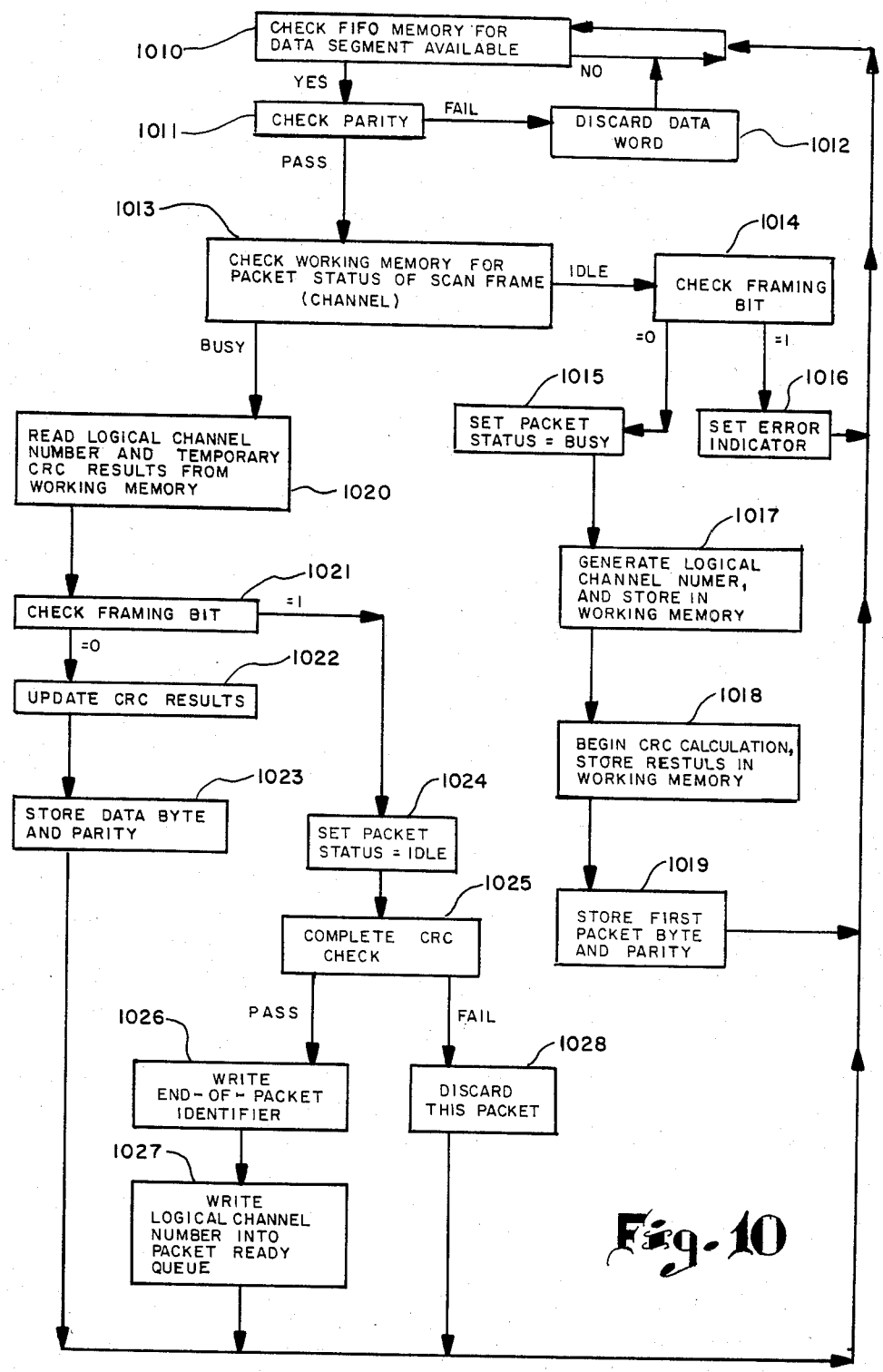

This is accomplished by packet assembly/disassembly circuit 308 operating according to the state table illustrated in FIG. 10. Packet assembly/disassembly circuit 308 contains assembly state machine 320. State machine 320 under a stored program control to perform the required control operations and accesses working memory 321 for mapping and status determination information. Assembly state machine 320 accesses transmit FIFO memory 303 to determine whether there is a data component available (1010) for transmission to packet switch circuit 105. If there is a data segment available, assembly/state machine 320 checks the parity of the data segment so obtained (1011) and if the parity so determined matches the parity bit in the data segment, working memory 321 is checked (103) to determine the packet status of the current scan frame. In particular, assembly state machine 320 reads the status of the current scan frame from working memory 321 and determines if the scan frame is idle. If the scan frame is idle, assembly state machine 320 then checks the framing bit (1014) to assure that the framing bit is set to zero. Assembly state machine 320 then writes a new packet status of busy (1015) into working memory 321 to indicate that this scan frame is now occupied by a data transmission. Assembly state machine 320 then generates a logic channel number and stores this in working memory 321 (1017). This is accomplished by combining the scan frame number and the packet address (which is the first byte of the data segment obtained from transmit FIFO memory 303). These two bytes of information are mapped by assembly state machine 320 into a logic channel number which indicates the virtual channel that will be used for transmissions to the packet switch 105. This logic channel number indicates the one (e.g. 331) of packet assembly areas 331-338 that will be used for this data transmission from transmit FIFO memory 303 to bus contention circuit 309.

Assembly state machine 320, having written the logic channel number into working memory 321, calculates the CRC code for the data segment obtained from transmit FIFO memory 303 and stores the results of this computation in working memory 321 (1018). Once this is accomplished, assembly state machine 320 stores the first packet byte and the parity in the packet assembly area 331 corresponding to the logic channel number determined above in step 1017. The packet assembly procedure continues as long as data segments are available in transmit FIFO memory 303 for this particular scan frame. For each iteration of this process, assembly state machine 320 determines that the scan frame is busy in step 1013 and branches to step 1020 when a data segment is obtained from transmit FIFO memory 303. State machine 320, further, reads the logic channel number and the CRC calculation results from working memory 321 (1020). This logic channel number indicates the packet assembly area 331, which is used to store the data segment for transmission, and the CRC results indicate the partial sum of CRC calculations for all of the data segments previously transmitted as part of this data message. At this time, assembly state machine 320 checks the framing bit (1021) to determine whether the end of a data message has been reached. If the framing bit is zero, the end of the message has not been reached and the CRC partial sum is updated by recalculating the CRC with the new data segment added to the previous partial sum (1022) and storing this result in working memory 321. Assembly state machine 320 then stores (1023) the data portion of the data segment and the parity bit in packet assembly area 331, which is identified by the logic channel number associated with the data transmission. When the end of the message is reached (1021) checking the framing bit will obtain a result of 1 indicating the presence of a framing bit. This causes assembly state machine 320 to reset the packet status to idle (1024) and write this result in working memory 321. When this has been accomplished, assembly state machine 320 completes the CRC calculation using the last data segment read (1025) and overwriting an end of packet identifier (1026) into packet assembly area 331 associated with this data transmission. The end of packet identifier is written over the last packet component received, which is the first byte of the two-byte CRC. The entire data message has now been completed and stored in packet assembly area 331 and assembly state machine 320 writes the logic channel number (1027) of this packet assembly area 331 into the buffer known as packet ready area 322 to indicate to bus contention circuit 309 that a packet is available for transmission to packet switch circuit 105.

BUS CONTENTION CIRCUIT

Figure 11:
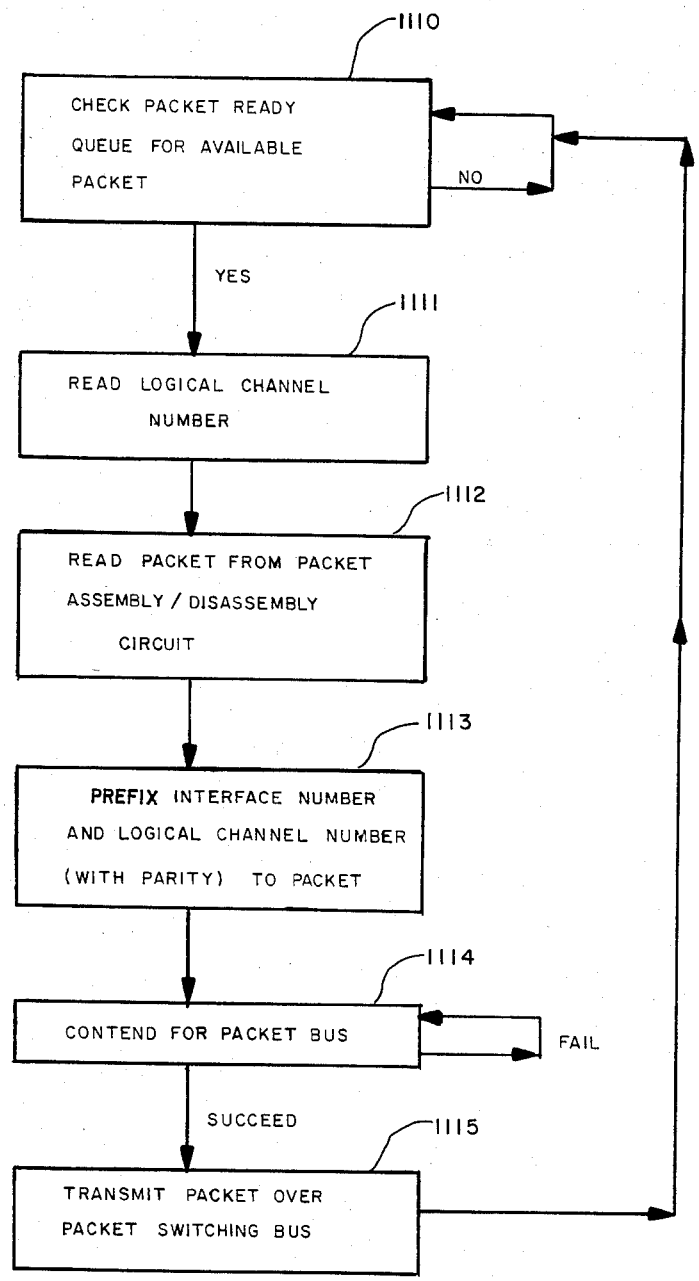
Figure 12:
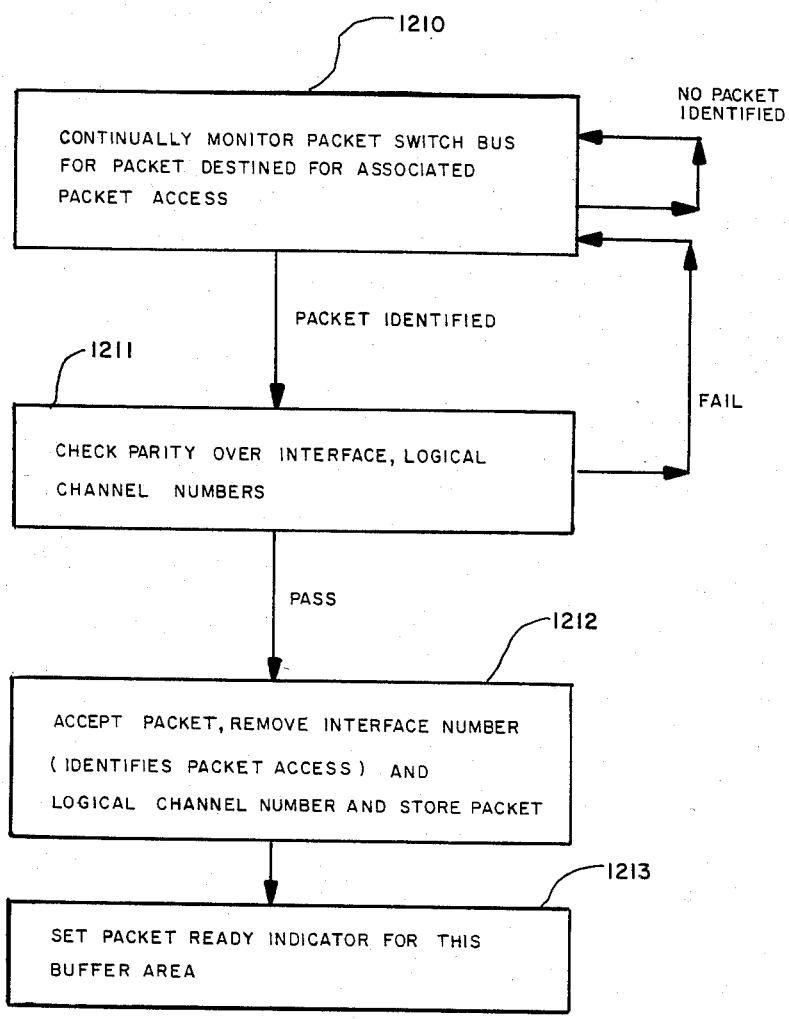
Figure 13:
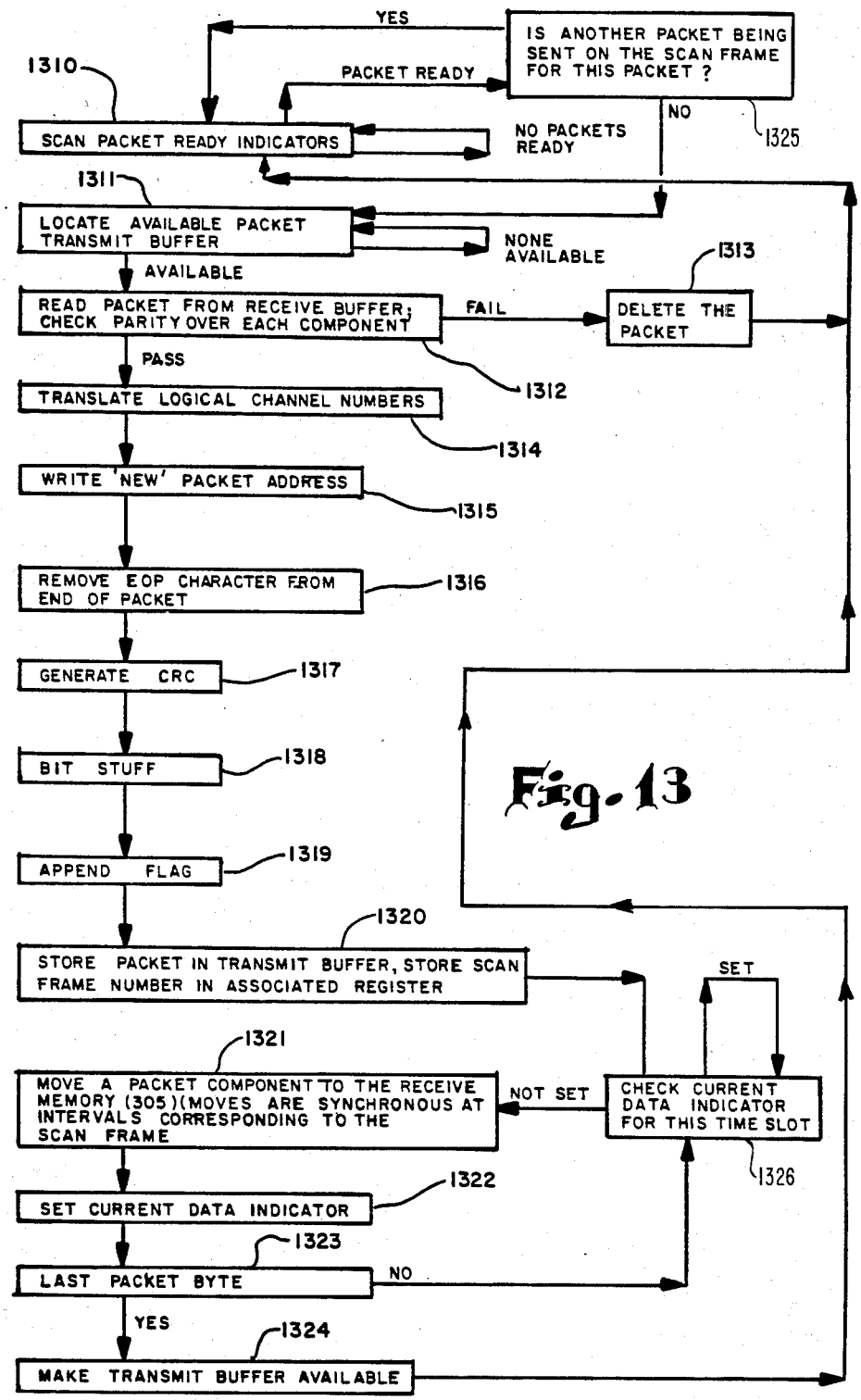

Bus contention circuit 309 is a processor controlled arbitration circuit which operates under the set of programmed commands which are illustrated in FIGS. 11 and 12. In particular, for transmissions to packet switch circuit 105, bus contention circuit 309 operates as illustrated in FIG. 11. Bus contention circuit 309 periodically reads (1110) the data from packet ready area 322 of packet assembly/disassembly circuit 308 to determine whether any packets have been assembled by this circuit for transmission to packet switch circuit 105. When an entry is read out of packet ready queve 322, bus contention circuit 309 uses this information to address the packet assembly area 331 identified by the logic channel number read (1111) from packet ready queve 322. Bus contention circuit 309 prepends an interface number and the logic channel number to the packet read out of packet assembly area 331(1112). This interface number is a predetermined digital representation of the packet access circuit 161 from which this transmission originated. Thus, the data message to be transmitted by packet switch circuit 105 contains not only the identification of the originating packet access circuit 161 but also the channel number which indicates the virtual channel through this packet access circuit 161. Bus contention circuit 309 having assembled the packet to be transmitted contends (1114) for packet bus AB. Once access has been granted by packet switch circuit 105, bus contention circuit 309 transmits (1115) an entire packet over the packet switch bus.

MESSAGE RECEPTION

Packet switch circuit 105 switches this data message in well-known fashion to the destination packet access circuit, which, in this case, is packet access circuit 165. During the switching process, the source interface and logical channel numbers are replaced by the destination interface and logical channel numbers. Obviously, all these access circuits are identical in structure, and the receive function will be discussed using FIG. 3 for the sake of economy of drawings. Thus, an incoming data message is read (in the format illustrated in FIG. 7) from packet bus AB into the packet assembly/disassembly circuit 308 where the format of the signal is converted to that illustrated in FIG. 8 for each byte or packet component of the transmitted packet. Once the packet component is disassembled, each successive element is sequentially stored in the memory location of receive memory 305 associated with the proper time slot and identified by the channel number in the format.

When packet switch circuit 105 completes transmission of a packet between an originating and a terminating packet access circuit, the methodology used by bus contention circuit 309 of packet access circuit 165 to receive this transmission is illustrated in FIG. 12. In particular, bus contention circuit 309 monitors packet switch bus AB (1210) for a packet which has a header identifying packet access circuit 165. When such a packet is recognized as being present on bus AB, bus contention circuit 309 stores the entire packet transmission in its memory, checks parity of this transmission (1211) and removes the interface number and the logic channel number portions of the header (1212). Thus, bus contention circuit 309 reformats the received transmission into the packet format originally obtained in transmitting this message from packet assembly area 331. Bus contention circuit 309 next sets the packet ready indicator (1213) which is stored in the segment of working memory 351 of packet assembly/disassembly circuit 308 corresponding to the logic channel number of the received transmission. At the same time as the packet ready indicator is set, bus contention circuit 309 writes the received packet into one (341) of the receive buffers 341-348 corresponding to the logical channel number of the received packet.

PACKET ASSEMBLY/DISASSEMBLY CIRCUIT

The disassembly state machine 350 of packet assembly/disassembly circuit 308 periodically accesses working memory 351 to search for a packet ready indication (1310) corresponding to one of the logic channels accessed by bus contention circuit 309. When a packet ready indicator has been identified as set, disassembly state machine 350 locates (1311) an available one (361) of packet transmit buffers 361-368 into which the received packet will be relocated. When an available packet transmit buffer 361 has been identified, disassembly state machine 350 reads out the received packet (1312) from the receive buffer 341 corresponding to the logic channel number obtained from working memory 351 and stores the received packet in the identified available packet transmit buffer 361. In shifting the received packet from one buffer to another, disassembly state machine 350 checks the parity over the components of the message to assure that no transmission errors have occurred. Once this transfer has been completed, disassembly state machine 350 resets the packet ready indication in working memory 351 so that bus contention circuit 309 can input succeeding packets in the available receive buffer 341. Disassembly state machine 350 also translates the logic channel number (1314) into the destination scan frame number and address byte for the packet. This new address byte is then overwritten (1315) over the address byte of the packet and the CRC computation (1317) is done on the entire message stored in transmit buffer 361. Disassembly state machine 350 appends a flag character to the end of this received message (1319) to delimit the end of the transmission. Disassembly state machine 350 also stores (1320) the destination scan frame number (calculated above) contained in the scan frame number register 371 associated with the transmit buffer 361 contains the received packet.

Disassembly state machine 352 now takes over control of the transmission. Disassembly state machine 352 moves the packet (1321) from transmit buffer 361 to receive memory 305 light bits at 2 time into the memory word location specified by the scan frame number stored in the scan frame number register 371 associated with transmit buffer 361. Disassembly state machine 352 sets a current data indicator (1322) in receive memory 305 to indicate that a new packet component as been stored therein for transmission to the destination port circuit. This operation continues until the last packet component (1323) has been transmitted and disassembly state machine 352 detects the flag character at the end of the packet. Disassembly state machine 352 then indicates the availability of transmit buffer 361 (1324) by updating the transmit buffer status (1324) in working memory 351.

RECEIVE STATE LOGIC

Figure 14:
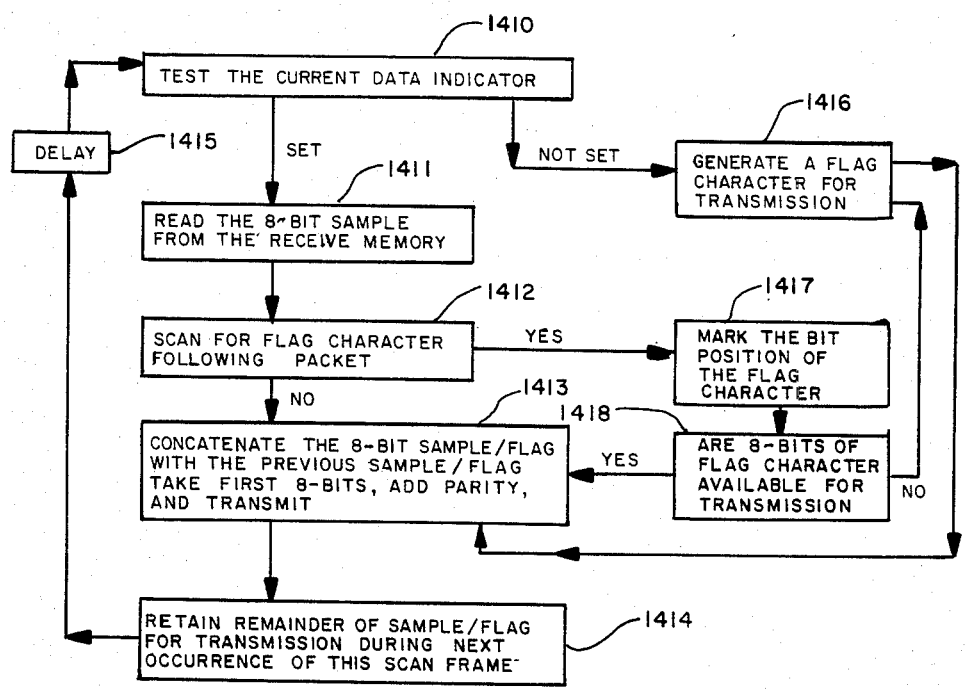

Receive state logic 306 operates according to the state table of FIG. 14. In particular, receive state logic 306 sequentially reads data message components out of receive memory 305 by enabling gate 311 via lead READ to address the word of the memory corresponding to the current scan frame, and reformats these message components for transmission to port data/control interface circuit 175 via bus PA. Thus, the data message is converted, according to the mapping information stored in control memory 302, into a byte multiplexed message format corresponding to that illustrated in FIG. 5 with the proper flag, address, control and CRC fields. Once receive state logic 306 has each data message byte properly formatted, receive state logic 306 outputs the data message byte to port data/control interface circuit 175 via bus PA5. Receive state logic 306 is a wired logic state machine which accesses control memory 302 to perform the mapping function between the packet data stored in receive memory 305 and the messages to be transmitted to port data/control interface circuit 175 via bus PA5. Receive state logic 306 accomplishes this by testing the current data indicators (1410) of receive memory 305 corresponding to the current scan frame to determine whether a new data message is stored therein. If the current data indicator is set, receive state logic 306 reads the eight bit sample (1411) stored in receive memory 305 corresponding to the current scan frame and then resets the current data indicator to indicate that the last entry has been processed. Receive state logic 306 concatenates (1413) the eight bit sample with the remainder of the previous sample not yet transmitted to the destination port circuit. Receive state logic 306 then takes the first eight bits stored in receive memory 305, calculates the parity of this eight bit word, adds the parity bit and transmits the resultant combination over bus PA5 to port data/control interface circuit 175. The remainder of this sample (1414) stored in receive memory 305 is readied for transmission during the next occurrence of the scan frame. This operation takes place during each occurrence of the scan frame until receive state logic 306 detects the presence of the flag character (1412) in the data transmission. At this time, the bit position of this flag character is noted and receive state logic 306 assures (1416-1418) the presence of eight bits of flag by adding to the flag character already stored until there is an eight bit flag available for transmission to the destination port circuit. This flag character is appended to whatever sample remains in receive memory 305 and the transmission process continues until the remainder of the sample and the eight bits of flag character are output on bus PA5. The messages so output on bus PA5 are received by port data/control interface circuit 175 and switched as described above to the port circuit enabled by the module processor 108 during this scan interval. The routing bit stored in the port data control interface circuit 175 is used to select between transmissions from the circuit switch (101) and the packet switch (105).

Thus, the system described above makes use of two switching network segments to switch voice and bulk data transmissions in a different manner than interactive data transmissions. In implementing this configuration two routing schemes are concurrently used. In particular, one switch segment (circuit switch 101) operates under control of a network map which is written by system processor 100 while the other switch segment (packet switch 106) is responsive to a routing bit in the control segment. It is apparent that more than two switch segments can be implemented by expanding the routing bit or by having system processor 100 write several different network maps. It is also obvious that any message segment could be switched by any switch segment since system processor 100 controls all call routing.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the spirit and the scope of the invention.

What is claimed is:

1. In a switching system which serves a plurality of communications circuit (T11-T58) each capable of generating multiple and concurrent types of transmissions and where each of said communication circuits is connected to an associated port circuit (111-158) where each port circuit is capable of concurrently transmitting all of said multiple types of transmission, a switching network for establishing communications connections among said communications circuits (T11-T58) by interconnecting said associated port circuits (111-158) comprising:

two or more switch segment means (101, 106) each of which serves all of said associated port circuits (111-158) wherein each of said switch segment means is responsive to a different one of said multiple types of transmissions;

interface means (171-175) connected to and interconnecting all of said associated port circuits (111-158) to all of said switch means (101,106), and responsive to all types of multiple and concurrent transmissions orginating from each of said associated port circuits (111-158) for sorting said multiple and concurrent transmissions by type of transmission; and means in said interface means (171—175) responsive to said transmissions sorted by type for routing each of said sorted transmission to the one of said switch segment means (101, 106) responsive to said type of transmission.

2. The system of claim 1 wherein said interface means (171-175) includes:

routing memory means (241) which contains a routing data entry for each of said associated port circuits (111-158) to identify the one of said switch means (101, 106) to which a type of transmission as received from each of said associated port circuits (111-158) is routed.

3. The system of claim 2 wherein said switching system includes:
   system processor means (100) responsive to the class of service assigned each of said associated port circuits (111-158) for setting said routing data associated with said associated port circuits (111-158) in said routing memory means (241) to identify the one of said switch means (101, 106) to which said type of transmission as received from each of said port circuits (111-158) is routed.

4. The system of claim 2 wherein said interfacing means (171-175) includes:
   routing data control means (242, 243) responsive to said routing, data stored in said routing memory means (241) for appending to said type of transmission as received from each of said associated port circuits (111-158) the one of said routing data associated with said one of each said associated port circuits (111-158).

5. The system of claim 4 wherein one (106) or more of said switch means (101, 106) includes:
   access means (161-165) connected to said interface means (171-175) and responsive to a predetermined set of said routing data appended to said type of transmission for enabling said switch means (106) to switch said type of transmission having said predetermined set of routing data appended thereto.

6. The system of claim 1 wherein one (101) or more of said switch means (101, 106) includes:
   control means (104) responsive to data stored therein for switching type of transmission from only the ones of said associated port circuits (111-158) identified by said stored data.

7. The system of claim 6 wherein said switching system includes:
   system processor means (100) responsive to the class of service assigned to each of said associated port circuits (111-158) for writing data into said control means (104) to identify the one of said switch means (101, 106) to which said type of transmission as received from each of said port circuits (111-158) is routed.

8. The system of claim 1 wherein each of said switch means (101, 106) serving all of said associated port circuits (111-158) contains a respective switching circuit (104, 105) operating asynchronously with respect to the other switching circuits (105, 104).

9. In a switching system which serves a plurality of communicating circuits (T11-T58) each capable of generating multiple and concurrent types of transmissions and where each of said communication circuits is connected to an associated port circuit (111-158) where each port circuit is capable of concurrently transmitting all of said multiple types of transmissions, a switching network for establishing communications connections among said communications circuits (T11-T58) by interconnecting said associated port circuits (111-158) comprising:
   first switch means (101) serving all of said associated port circuits (111-158);
   second switch means (106) serving all of said associated port circuits (111-158) and responsive to a first type of said multiple and concurrent transmissions; and
   interface means (171-175) connected to and interconnecting all of said associated port circuits (111-158) to both said first (101) and said second (106) switch means, and responsive to all of said multiple and concurrent types of transmissions received from any of said associated port circuits (111-158) for routing said first type of multiple and concurrent transmissions to said second switch means (106), and all the remaining types of said multiple and concurrent types of transmissions to said first switch means (101).

10. The system of claim 9 wherein said interface means (171-175) includes:
    routing memory means (241) which contains a routing bit entry for each of said associated port circuits (111-158) to identify the ones of said associated port circuits (111-158) whose type of transmission is to be routed to said second type of switch means (106).

11. The system of claim 10 wherein said switching system includes:
    system processor means (100) responsive to the class of service assigned to each of said associated port circuits (111-158) for setting said routing bit in said routing memory means (241) associated with each of said associated port circuits (111-158) to reflect said class of service.

12. The system of claim 10 wherein said interface means (171-175) includes:
    routing data control means (242, 243) responsive to said routing bits stored in said routing memory means (241) for setting a routing bit in each of type of transmission as received from said associated port circuits (111-158) to correspond to the routing bit stored in said routing memory means (241).

13. The system of claim 12 wherein said second type of switch means (106) is responsive to said routing bit in said type of transmission for switching said type of transmission only if said routing bit in said type of transmission is set in a predetermined state.

14. The system of claim 9 wherein said first type of switch means (101) includes:
    control means (104) responsive to data stored therein for switching said remaining type of transmission from only the ones of said associated port circuits (111-158) identified by said stored data.

15. The system of claim 14 wherein said switching system includes:
    said system processor means (100) is responsive to the class of service assigned to each of said associated port circuits (111-158) for writing data into said control means (104) to identify the one type of said switch means (101, 106) to which the multiple types of transmissions from each of said associated port circuits (111-158) are routed.

16. The system of claim 9 wherein said interface means (171-175) are responsive to a receipt of said multiple types of transmissions for transmitting said selected type of transmission to a terminating one of said communications circuits (T11-T58) identified by said selected type of transmission via the one of said associated port circuits (111-158) associated with said identified one of said communication circuits.

17. The system of claim 9 wherein said first switch means (101) includes:
    a plurality of port data store means (102, 103) connected to said interface means (171-175) and responsive to said remaining type of transmission for storing said remaining type of transmission; and time slot interchange circuit means (104) connected to said port data store means (102, 103) and responsive to a set of data stored in said time slot interchange circuit means (104) for transmitting said remaining type of transmission among said port data store means (102, 103) for storage in said port data store means (102, 103).

18. The system of claim 17 wherein said switching system includes:

system processor means (100) responsive to a predefined set of criteria for writing said data in said time slot interchange circuit means (104).

19. The system of claim 18 wherein said system processor (100) is responsive to the class of service assigned each of said associated port circuits (111-158) for writing said data in said time slot interchange circuit means (104).

20. The system of claim 17 wherein said interface means (171-175) periodically reads each of said transmitted remaining type of transmissions out of said port data store means (102, 103) for retransmissions to the one (T58) of said communications circuits (T11-T58) identified by said system processor (100) as associated with said transmitted remaining type of transmission.

21. In a switching system which serves a plurality of communications circuits (T11-T58) each capable of generating multiple and concurrent types of signals and where each of said communications circuits is connected to an associated port circuit (111-158) where each port circuit is capable of concurrently transmitting all of said multiple types of signals, a bifurcated switching network for establishing communications connections among said communications circuits (T11-T58) comprising:

first switch segment (101) serving all of said associated port circuits (111-158) and responsive to a first predetermined set of signal types from said associated port circuits for switching said first set of signal types among said associated port circuits (111-158); and second switch segment (106) serving all of said associated port circuits (111-158) and responsive to a second predetermined set of signal types from said associated port circuit for transmitting said second set of signal type among said associated port circuits (111-158); and means connected to and interconnecting said associated port circuits (111-158) and said first and second switch segments (101, 106) and responsive to said multiple and concurrent types of signals generated by any one of said communication circuits for routing the ones of said multiple types of signals in said first predetermined set of signal types to said first switch segment (101) and the ones of said multiple types of signals in said second predetermined set of signal types to said second switch segment (106).

22. In a switching system which serves a plurality of communications circuits (T11-T58) each capable of generating multiple and concurrent types of signals and where each of said commnunications circuits is connected to an associated port circuit (111-158) where each port circuit is capable of concurrently transmitting all of said multiple types of signals, and wherein said switching system has a switching network having two or more switching network segments each responsive to a different type of signal, a method of transmitting multiple types of signals among various ones of said communications circuits (T11-T58) comprising the steps of:

receiving all of said signals originated by any one of said communications circuit (T11-T58) having said associated port circuits (111-158);

classifying each of said received signals into a single one of said multiple types of signals according to a predefined criteria; and routing each of said classified received signals to the one of said switching network segments responsive to said one of said multiple types of signals for transmission to its indicated destination.

23. The system of claim 22 wherein the step of classifying includes the step of:

appending a routing bit to said transmitted signal types to indicate the one of said switching network segments destined to receive said transmitted signal types.

24. The system of claim 22 wherein the step of classifying includes the step of:

determining the class of service of the one of said communication circuits (T111-T58) originating said transmitted signal types; and translating said determined class of service to a corresponding routing bit.

25. The system of claim 22 wherein the step of routing includes the step of:

blocking the ones of said transmitted signal types from being transmitted through each of said switching network segments which transmitted signal types have appended thereto a routing bit indicating a one of said switching network segments different from the receiving one.

26. In a switching system having a plurality of call serving port circuits (111-158) where each port circuit concurrently generates multiple types of data:

a first switching segment responsive to a first type of data (101) and a second (106) switching segment responsive to a second type of data where each segment is independently effective for establishing a connection between a calling (111) and a called (158) one of said port circuits (111-158);

an interface (171-175);

a first path for connecting said port circuits (111-158) to said interface (171-175);

a second path for connecting said interface (171-175) to both of said switching segments (101, 106);

means (241-243) in said interface (171-175) responsive to said first and second type of data where each call served by said calling port circuit (111) generates and applies control information to said second path specifying the one of said switching segments (101, 106) that is to be used in extending said call to said called one of said port circuits (158); and means (161-165) responsive to said control information applied to said second path for causing each call to be extended to said called port circuit (158) via the segment (106) specified by said control information generated in response to said types of data received.

27. The system of claim 26 wherein said interface (171-175) includes:

routing memory means (241) which contains a routing data entry for each of said port circuits (111-158) to identify the one of said switching segments (101, 106) to which the data transmissions from each of said port circuits (111-158) are routed.

28. The system of claim 27 wherein said switching system includes:

system processor means (100) responsive to the class of service assigned each of said port circuits (111-158) for setting said routing data associated with said port circuits (111-158) in said routing memory means (241) to identify the one of said switch means (101,106) to which the data transmissions from each of said port circuits (111-158) are routed.

29. The system of claim 28 wherein said interface means (171-175) includes:

routing data control means (242, 243) responsive to said routing data stored in said routing memory means (241) for appending to the data transmissions from each of said port circuits (111) the one of said routing data associated with said port circuit (111).

30. The system of claim 29 wherein one (106) or more of said switch means (101,106) includes:

access means (161-165) connected to said interface means (171-175) and responsive to a predetermined set of said routing data appended to the data transmissions for enabling said switch means (106) to switch said transmissions having said predetermined set of routing data appended thereto.

31. In a switching system having a plurality of call serving port circuits (111-158) where each port circuit concurrently generates multiple types of data:

a first (101) switching segment responsive to a first type of data and a second (106) switching segment responsive to a second type of data each of which is independently effective to establish a connection between a calling (111) and called (158) one of said port circuits (111-158);

and interface (171-175);

a first path for connecting said port circuits (111-158) to said interface (171-175);

a second path for connecting said interface (171-175) to both of said switching segments (101, 106); and means (241-243) in said interface (171-175) responsive to data type as associated with each call served by said calling port circuit (111) to generate and apply control information to said second path specifying the one of said switching segments (101, 106) that is to be used in extending said call to said called port circuit (158).

32. The system of claim 31 in which said second (106) switching segment includes:

a detector (161-165) connected to said second path for monitoring said data type associated with the call information applied by said interface (171-175) to said second path; and means (301) in said detector responsive to said monitoring for causing said call to be extended from said interface (171-175) via the segment (106) specified by said control information generated in response to said type of data received.

* * * * *